US012679080B2

(12) United States Patent
Saunders et al.

(10) Patent No.: US 12,679,080 B2
(45) Date of Patent: Jul. 14, 2026

(54) PHENOLIC PANEL AND ATTACHMENT/DETACHMENT SYSTEM AND PROCESS

(71) Applicant: Temper IP, LLC, Cedar Springs, MI (US)

(72) Inventors: Collin J. Saunders, Holland, MI (US); Luke A. Martin, Wyoming, MI (US); William C. Dykstra, Rockford, MI (US)

(73) Assignee: Temper IP, LLC, Rockford, MI (US)

( * ) Notice: Subject to any disclaimer, the term of this patent is extended or adjusted under 35 U.S.C. 154(b) by 481 days.

(21) Appl. No.: 18/552,946

(22) PCT Filed: Mar. 30, 2022

(86) PCT No.: PCT/US2022/071428
§ 371 (c)(1),
(2) Date: Sep. 28, 2023

(87) PCT Pub. No.: WO2022/213078
PCT Pub. Date: Oct. 6, 2022

(65) Prior Publication Data
US 2024/0375387 A1 Nov. 14, 2024

Related U.S. Application Data

(60) Provisional application No. 63/200,840, filed on Mar. 31, 2021.

(51) Int. Cl.
*B32B 27/42* (2006.01)
*B32B 3/26* (2006.01)
(Continued)

(52) U.S. Cl.
CPC .............. *B32B 27/42* (2013.01); *B32B 3/266* (2013.01); *B32B 7/06* (2013.01); *B32B 7/12* (2013.01);
(Continued)

(58) Field of Classification Search
CPC ....... B32B 15/08; B32B 15/098; B32B 15/20; H05B 6/02; H05B 6/10; H05B 6/105
See application file for complete search history.

(56) References Cited

U.S. PATENT DOCUMENTS 6,495,265 B1 12/2002 Krebs et al.
2004/0091694 A1 5/2004 Holzer et al.
(Continued)

FOREIGN PATENT DOCUMENTS

EP 0184760 A2 6/1986

OTHER PUBLICATIONS

International Search Report and Written Opinion from corresponding PCT Application No. PCT/US2022/071428 dated Jun. 16, 2022.

*Primary Examiner* — Zachary M Davis
(74) *Attorney, Agent, or Firm* — HONIGMAN LLP

(57) ABSTRACT

A system for attaching a phenolic panel to a metal part includes a phenolic laminate panel having (i) a phenolic panel, (ii) a ferromagnetic susceptor bonded at an inner side of the phenolic panel via higher melting point adhesive and (iii) a non-magnetic shield having an outer side bonded at an inner side of the ferromagnetic susceptor via higher melting point adhesive. A lower melting point adhesive is applied at an inner side of the non-magnetic shield opposite from the outer side of the non-magnetic shield. With the phenolic laminate panel disposed at a metal part, an electromagnetic field is generated at the phenolic laminate panel to heat the phenolic laminate panel to a temperature greater than the melting point of the lower melting point adhesive and less than the melting point of the higher melting point adhesive to bond the phenolic laminate panel to the metal part.

27 Claims, 9 Drawing Sheets

(51) Int. Cl.

| | |
|---|---|
| *B32B 7/06* | (2019.01) |
| *B32B 7/12* | (2006.01) |
| *B32B 15/04* | (2006.01) |
| *B32B 15/098* | (2006.01) |
| *B32B 15/18* | (2006.01) |
| *B32B 15/20* | (2006.01) |
| *C08J 5/12* | (2006.01) |
| *C09J 5/06* | (2006.01) |
| *H05B 6/10* | (2006.01) |
| *F41H 5/04* | (2006.01) |

(52) U.S. Cl.
CPC .......... *B32B 15/043* (2013.01); *B32B 15/098* (2013.01); *B32B 15/18* (2013.01); *B32B 15/20* (2013.01); *C08J 5/128* (2013.01); *C09J 5/06* (2013.01); *H05B 6/105* (2013.01); *B32B 2307/202* (2013.01); *B32B 2307/208* (2013.01); *B32B 2571/00* (2013.01); *B32B 2605/00* (2013.01); *C08J 2361/04* (2013.01); *F41H 5/0457* (2013.01)

(56) References Cited

U.S. PATENT DOCUMENTS

| | | | |
|---|---|---|---|
| 2010/0071539 A1 | 3/2010 | Boczek et al. | |
| 2015/0260483 A1 | 9/2015 | Wibby et al. | |

All measurements in inches (").
All temperature in °F.

0.005" Susceptor + 0.005" Shield: Power & Frequency Heating

Temperatures measured at 15 seconds

| Frequency Current | 200kHz | 350kHz | 500kHz | Measure (Temp) |
|---|---|---|---|---|
| 6A | 81 | 85 | 89 | susc |
| | 76 | 79 | 81 | copper |
| | 71 | 72 | 72 | steel |
| 12A | 104 | 117 | 127 | susc |
| | 89 | 96 | 102 | copper |
| | 74 | 76 | 77 | steel |
| 24A | 189 | 227 | 251 | susc |
| | 136 | 156 | 171 | copper |
| | 85 | 90 | 93 | steel |
| 48A | 306 | 326 | 335 | susc |
| | 205 | 217 | 222 | copper |
| | 103 | 107 | 107 | steel |

Temperatures Measured:
Susceptor temperature

Copper temp (min)
(Closer to Susc temp is better)

Steel temp (max)
(Lower is better)

Diagrams are from this test, also the best-performing result

FIG. 5

PHENOLIC PANEL AND ATTACHMENT/DETACHMENT SYSTEM AND PROCESS

CROSS REFERENCE TO RELATED APPLICATIONS APPLICATION

The present application is a 371 national stage filing of PCT/US2022/071428, filed Mar. 30, 2022, which claims the filing benefits of U.S. provisional application Ser. No. 63/200,840, filed Mar. 31, 2021, which is hereby incorporated herein by reference in its entirety.

FIELD OF THE INVENTION

The present invention relates generally to a method and system for attaching a phenolic panel at a metal panel, such as for an armored vehicle or carrier.

BACKGROUND OF THE INVENTION

Armored vehicles or carriers often have a phenolic material adhered or bonded to the insides of the steel walls of the carriers (see FIG. 1, which shows a phenolic panel adhered to a steel part). The phenolic material "catches" or absorbs/ retains any scrap metal that may be bouncing or ricocheting around within the carrier and also acts as an additional armor to the vehicle. However, the phenolic material is glued or bonded to the steel, and when the phenolic gets damaged and needs to be replaced, the phenolic material typically needs to be physically ground out of the vehicle. Such a process takes a lot of time (weeks to months), and in many cases it is cheaper to replace the vehicle.

SUMMARY OF THE INVENTION

The present invention provides a phenolic material that has five layers on it so that the phenolic panel is ready to be applied to a metal (e.g., steel) part or panel. The laminate phenolic panel includes a panel or sheet or substrate of the phenolic material, with a layer of higher melting point temperature adhesive (e.g., adhesive with a melting point of around 350 or 400 degrees Fahrenheit) applied to a side or surface of the substrate, a ferromagnetic susceptor disposed on the first layer of higher melting point temperature adhesive, a second layer of higher melting point temperature adhesive disposed at the ferromagnetic susceptor, and a copper shield (or other suitable non-magnetic shield material) disposed at the second layer of higher melting point temperature adhesive. The panel and layers are heated and pressed together in a heated laminating press-type process. Then, after cooling the laminate construction (whereby the phenolic material and the ferromagnetic susceptor and the copper shield are bonded together as a laminate construction), a layer of lower melting point temperature adhesive (e.g., a layer of adhesive having a lower melting point, such as 200 degrees Fahrenheit) is then applied at the copper shield to complete the blank or panel.

The laminate panel is then disposed at a metal (e.g., steel) part or panel and electromagnetic heating coils are powered to generate an electromagnetic field, which, when the laminate panel is exposed to the electromagnetic field, heats the ferromagnetic susceptor. Pressure (e.g., a low pressure, such as between about 1 psi and 10 psi or more) is applied to the laminate panel at the metal panel during or after heating of the ferromagnetic susceptor. The lower temperature hot bonding adhesive melts (and only the lower temperature or 200 degrees Fahrenheit hot bonding adhesive melts, because it does not get hot enough for the 350 degrees Fahrenheit hot bonding adhesive to melt), and then when it cools/cures, the phenolic panel is bonded to the metal panel.

To remove the phenolic panel from the metal panel, heat is applied and a lever or crow bar (or other suitable prying means) is used so that, once the lower temperature adhesive melts, the phenolic panel is removed from the metal panel.

Optionally, the ferromagnetic susceptor and/or the copper shield may have a plurality of holes in them so there is a continuous (bridge) of resin that is not separated during the attachment or removal of the phenolic panel.

Optionally, a phenolic laminate construction could also be applied using resistance heating (or microwave heating or radiant heating via convection). For example, the panel may have a heatable substrate (heatable via applying electrical current thereto) that, when heated, melts the low temperature adhesive layer to bond the laminate construction to the metal panel. In such an application, the laminate construction may not include a copper shield.

These and other objects, advantages, purposes and features of the present invention will become more apparent upon review of the following specification in conjunction with the drawings.

DESCRIPTION OF THE PREFERRED EMBODIMENTS

Figure 1:
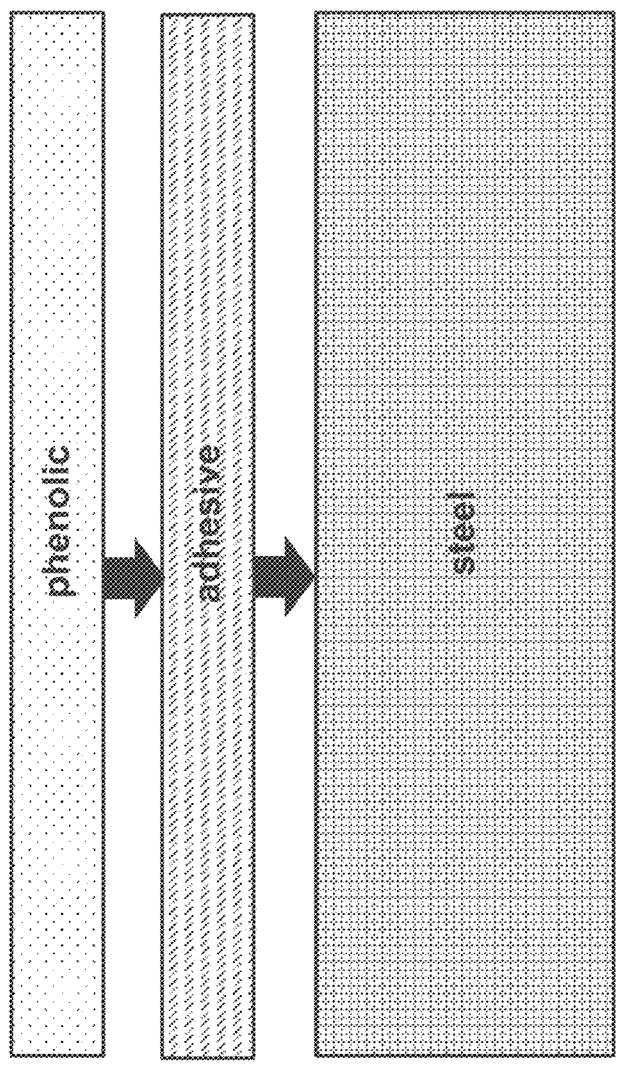
FIG. 1 is a schematic of a phenolic panel adhesively attached at a metal panel.

A heated adhesive system to attach a phenolic piece or panel or substrate or component to a metal panel or substrate or component or part (e.g., a panel or substrate or component or part formed of steel, aluminum, or a composite material) includes a laminate phenolic panel having an outer layer of phenolic material, an inner or attaching layer of low melting point adhesive, and internal layers including a ferromagnetic susceptor and a non-magnetic shield. The ferromagnetic susceptor is heated when exposed to a magnetic field, the heating causing the low melting point adhesive to melt and bond to the metal panel, and the non-magnetic shield prevents the metal panel from being heated via exposure to the magnetic field. With the phenolic panel attached at a metal (e.g., steel) panel, the system is able to be reheated to remove the phenolic panel later, without overheating the metal part and affecting its heat treated properties. The laminate phenolic sheet may comprise a four foot by eight foot sheet or other suitable size, whereby the sheet is provided as a blank that can be cut down into any number of individual parts, such as at the repair facility, or at the original part manufacturer, or the laminate phenolic sheet may be provided as individual parts (formed/fabricated for a particular application with associated part numbers) ready to be installed. Such a phenolic panel may be formed of weighted layers of cotton, paper or glass fabric mix that are placed under heat and pressure and filled with synthetic resin, which creates an extremely durable and tough material that is lighter than aluminum but offers many of the same benefits and applications.

The system uses high-frequency electromagnetic induction heating to heat a ferromagnetic susceptor in the adhesive layer of the laminate construction, while shielding the steel with a copper layer (or other suitable non-magnetic material) that is also in the adhesive layer. Multiple adhesive melt temperatures are employed to facilitate this geometrically, in assembly and disassembly.

Referring now to the drawings and the illustrative embodiments depicted therein, the phenolic laminate construction panel 12 (see FIGS. 2 and 3) comprises a layer or sheet or substrate of phenolic material 14, with a higher melting point adhesive 16 (e.g., an adhesive having a melting temperature/bonding temperature of around 350 or 400 degrees Fahrenheit) applied at a side or surface of the phenolic panel 14. A ferromagnetic susceptor 18 is adhered at the side or surface of the phenolic panel 14 via the higher melting point adhesive 16. Another layer of the higher melting point adhesive 16 (such as the same adhesive as used to bond the susceptor 18 to the phenolic 14 or such as a different adhesive) is applied at the opposite side of the susceptor 18 from the phenolic 14 and a non-magnetic (e.g., copper or other suitable non-magnetic material) shield 20 is adhered at the side or surface of the susceptor 18 via the second layer of the higher melting point adhesive 16. A layer of a lower melting point adhesive 22 (e.g., an adhesive having a melting temperature/bonding temperature of around 200 degrees Fahrenheit) is applied at the opposite side of the copper shield 20 from the susceptor 18 and phenolic layer 14 to complete the laminate construction.

Thus, the phenolic laminate construction panel 12 includes layers of a phenolic panel 14, high melting point adhesive 16, a ferromagnetic susceptor 18, a copper or non-magnetic shield 20, and a low melting point adhesive 22 laminated together. The phenolic panel 14 may form an outermost layer of the laminate panel 12 such that a first or outer surface 14a of the phenolic panel 14 provides an outer surface of the laminate panel 12 and a second or inner surface 14b of the phenolic panel 14 opposite the first surface 14a receives the first layer of high melting point adhesive 16. A first surface 18a of the ferromagnetic susceptor 18 is adhered to the second surface 14b of the phenolic panel 14 via the first layer of high melting point adhesive 16 and a second surface 18b of the susceptor opposite the first surface 18a receives the second layer of high melting point adhesive 16. A first surface 20a of the copper or non-magnetic shield 20 is adhered to the second surface 18b of the ferromagnetic susceptor 18 via the second layer of high melting point adhesive 16 and a second surface 20b of the copper shield 20 opposite the first surface 20a receives the low melting point adhesive 22. The low melting point adhesive 22, when heated by induction heating of the ferromagnetic susceptor 18, melts to adhere the phenolic laminate construction panel 12 to a receiving panel or substrate 10.

Figure 2:
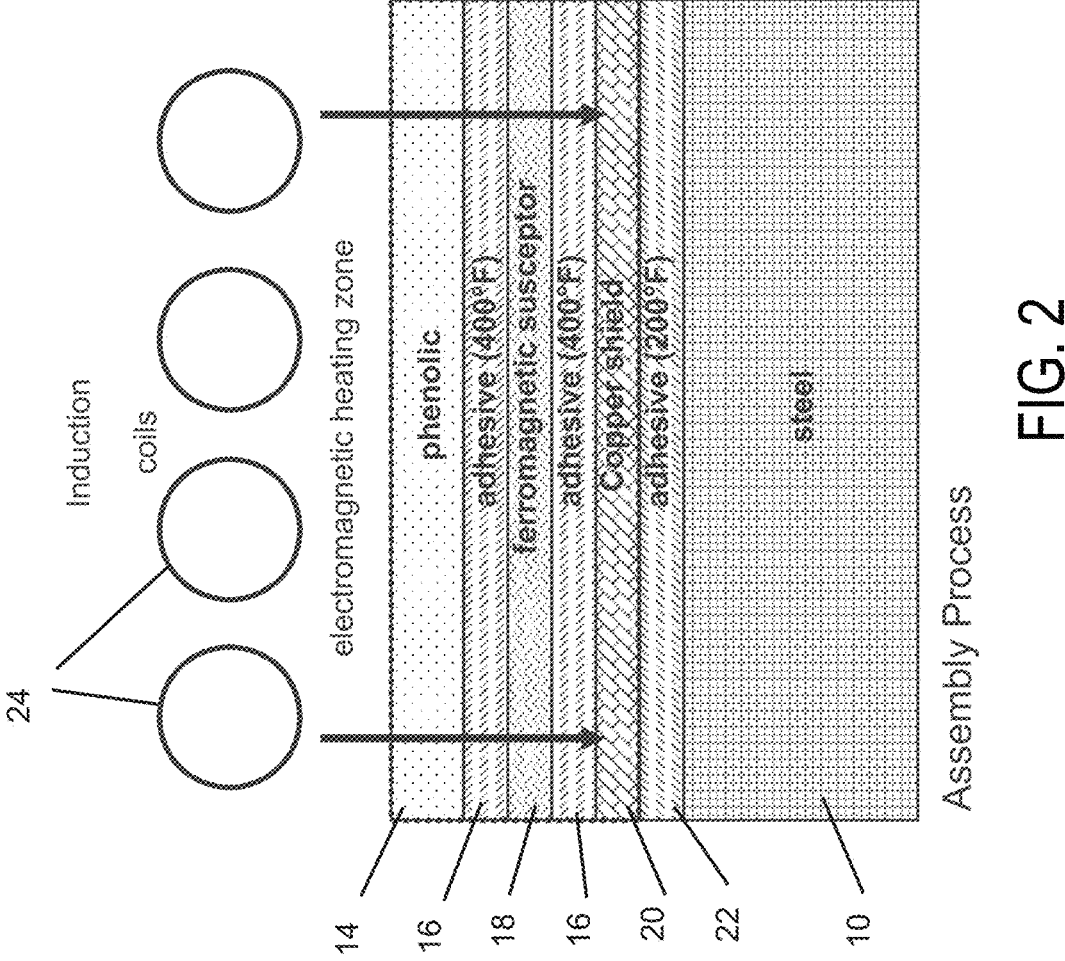
FIG. 2 is a schematic of a phenolic laminate panel having a phenolic panel adhesively attached (via a first layer of higher melting point adhesive) at a ferromagnetic susceptor, which is adhesively attached (via a second layer of higher melting point adhesive) at a copper shield, with the phenolic laminate panel adhesively attached (via a layer of lower melting point adhesive) at a metal panel.

As shown in FIG. 2, the laminate panel 12 is bonded to a metal (e.g., steel) panel 10 via the lower melting point adhesive 22. This is achieved by (i) positioning the laminate panel 12 at the metal panel 10 so that the side of the laminate panel 12 having the lower melting point adhesive 22 engages the metal panel 10 and (ii) generating an electromagnetic field to heat the susceptor 18 sufficient amount to melt the lower melting point adhesive 22 without melting the higher melting point adhesive layers 16. For example, induction coils 24 may be energized in proximity to the laminate panel 12 so that the electromagnetic field generated by the induction coils 24 may pass through the phenolic panel 14 and high melting point adhesive 16 to inductively heat the ferromagnetic susceptor 18. Heat generated by the ferromagnetic susceptor 18 heats the laminate panel 12 to melt the low melting point adhesive 22 without melting the high melting point adhesive 16. The copper shield 20 limits or precludes the electromagnetic field from reaching the metal part 10 and thus limits or precludes heating of the metal part 10. Once the lower melting point adhesive 22 is sufficiently melted (at which time pressure may be applied to the panel or part to press them together during the bonding process) and then cooled or cured, the phenolic laminate panel 12 is adhered or bonded to the metal part 10.

Figure 3:
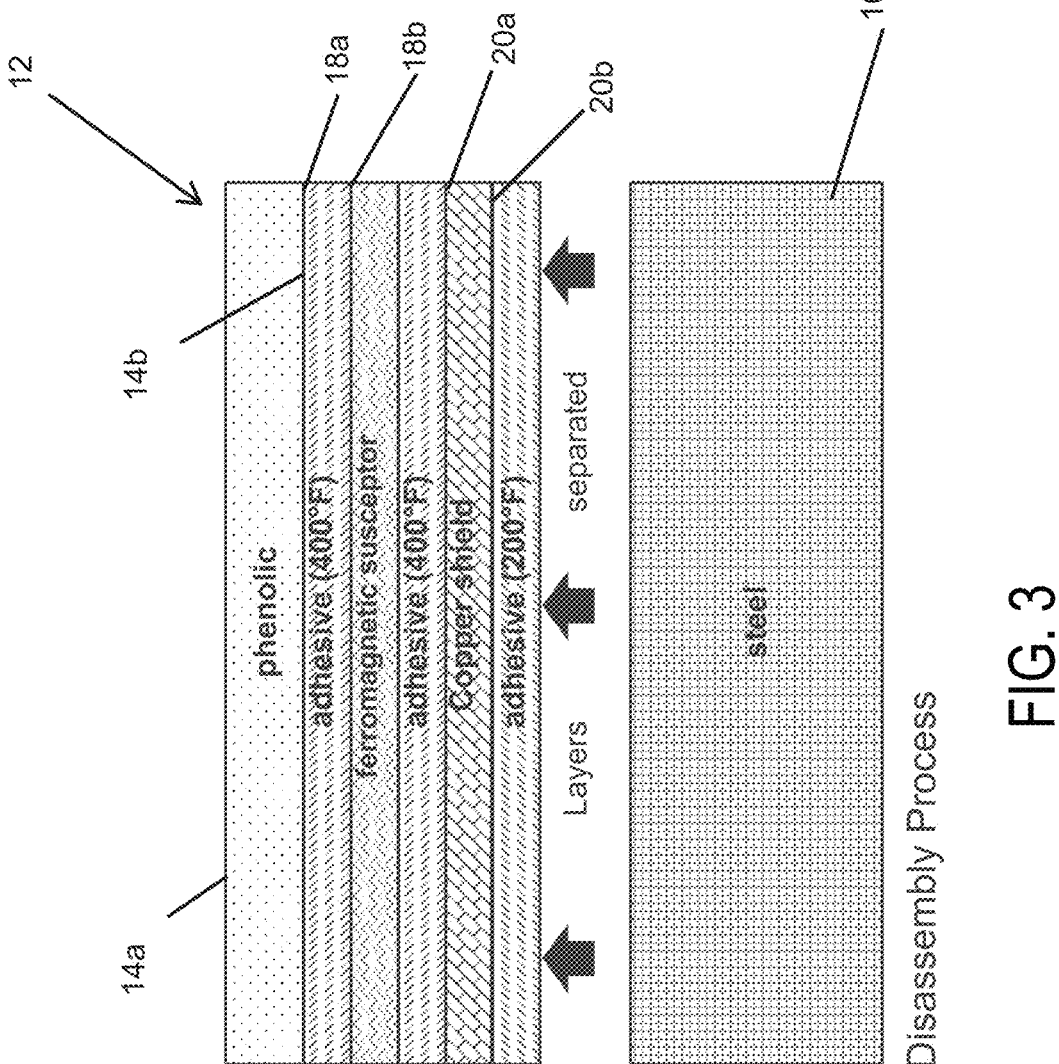
FIG. 3 is a schematic of the phenolic laminate panel of FIG. 2, shown removed from the metal panel via melting of the lower melting point adhesive.

As shown in FIG. 3, if the phenolic panel 14 later becomes damaged and needs to be replaced, the laminate construction 12 can be removed by applying an electromagnetic field at the panel 12 to again heat the susceptor 18 a sufficient amount to melt the lower melting point adhesive 22 without melting the higher melting point adhesive layers 16. When the lower melting point adhesive 22 is sufficiently melted, the panel 12 can be removed from the metal part 10, such as via prying or pulling the panel 12 from the part 10 to break the bond of the lower melting point adhesive 22 between the copper shield 20 and the metal part 10.

Figure 4:
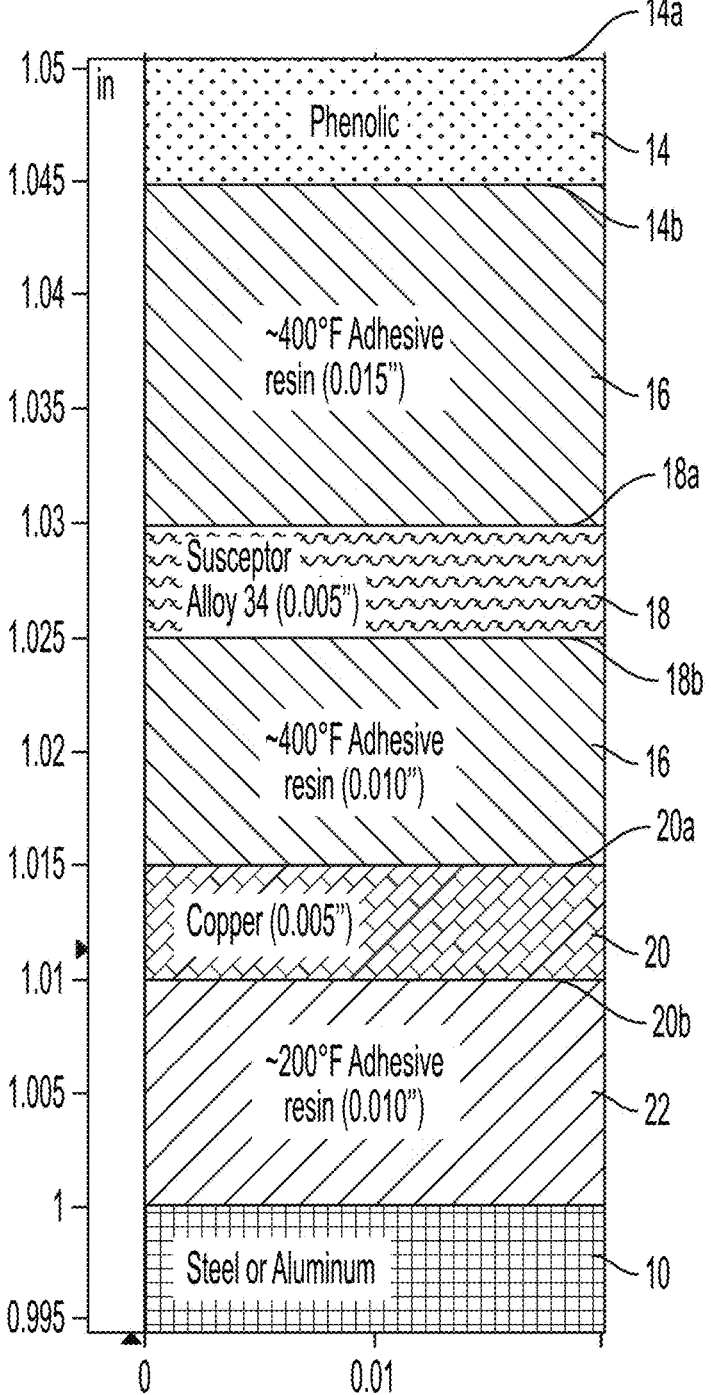
FIG. 4 is a schematic of an exemplary laminate construction of the phenolic laminate panel.

FIG. 4 illustrates an exemplary phenolic laminate construction 12, with exemplary thicknesses and types of material. As shown in FIG. 4, the susceptor 18 and shield 20 may have thicknesses of around 0.005 inches. The first layer of high melting point adhesive 16 between the phenolic layer 14 and the susceptor may have a thickness of around 0.015 inches. The second layer of high melting point adhesive 16 between the susceptor 18 and copper shield 20 and the layer of low melting point adhesive 22 may each have a thickness of around 0.01 inches.

Figure 5:
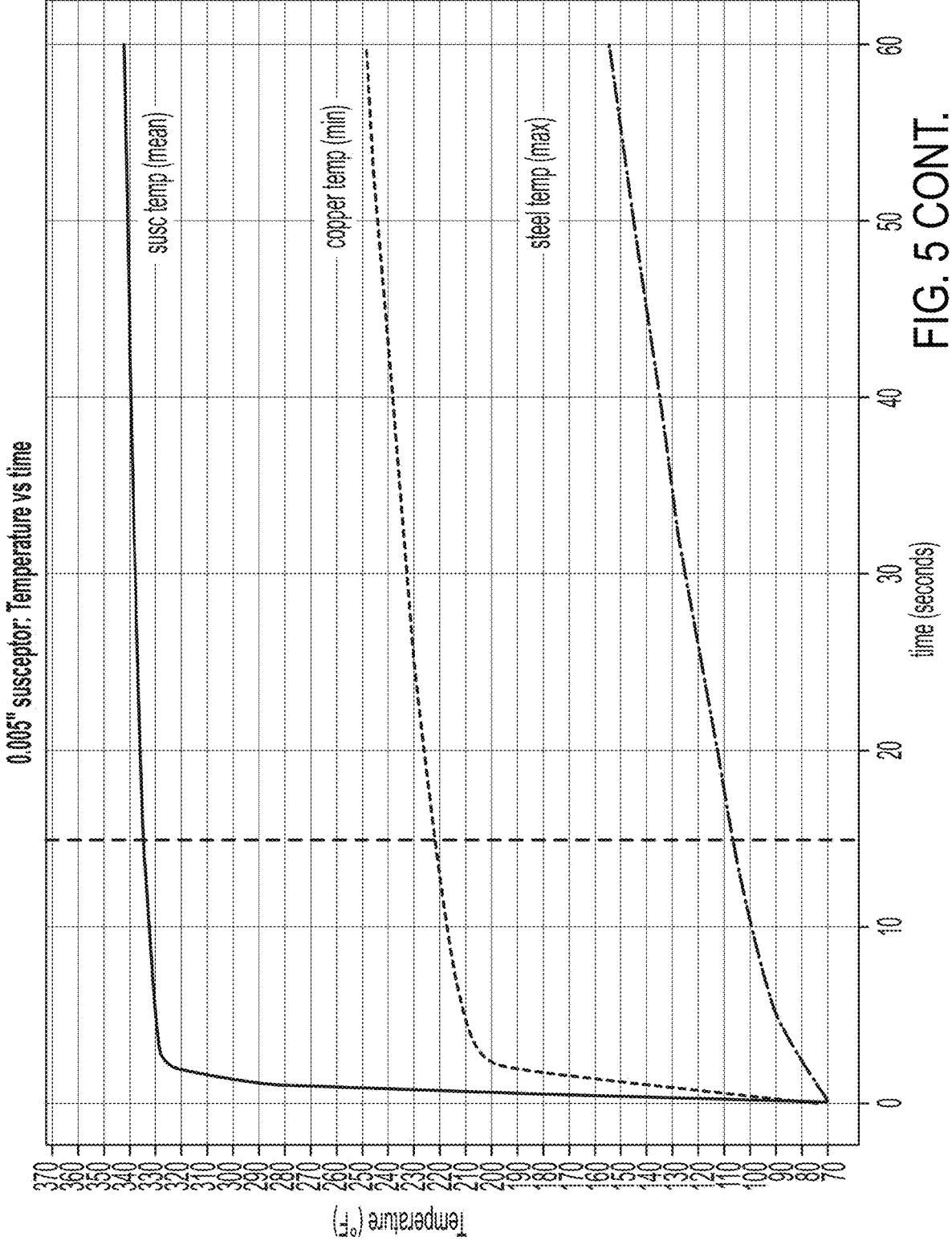
FIG. 5 shows test results on testing the exemplary laminate construction of FIG. 4, where the temperature and magnetic fields experienced at the layers of the phenolic laminate panel were measured when the phenolic laminate panel was exposed to electromagnetic fields generated using different electrical currents and frequencies.
Figure 5:
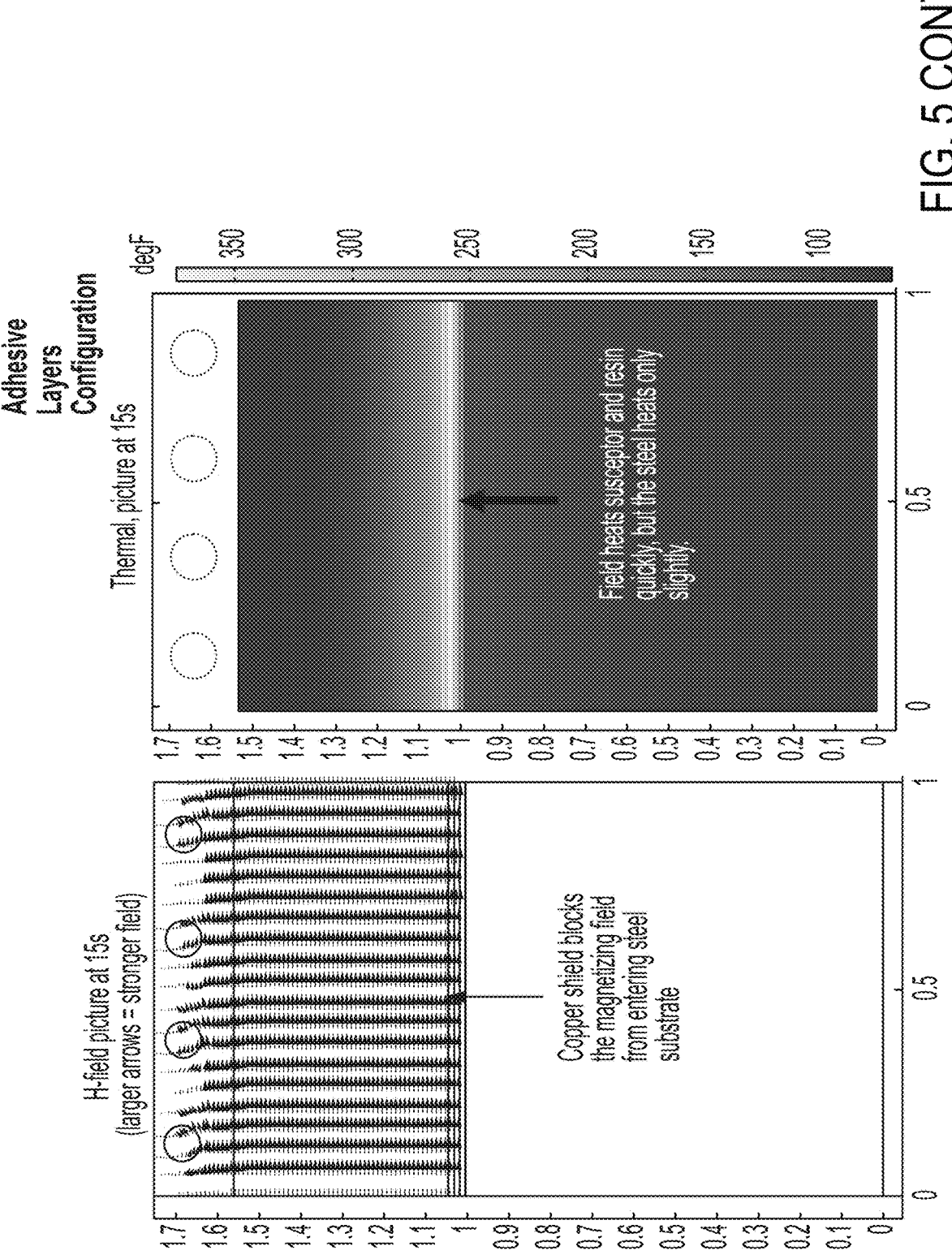

FIG. 5 shows test results that show that, for a particular current and frequency applied (for the electromagnetic field), different temperatures are achieved at the susceptor, the copper shield, and the metal part. For example, at 48 A and 500 kHz, the susceptor reaches a temperature of about 335 degrees Fahrenheit (which is below the 400 degree melting point of the higher melting point adhesive), while the copper shield reaches a temperature of about 222 degrees Fahrenheit (which is above the 200 degree melting point of the lower melting point adhesive and below the 400 degree melting point of the higher melting point adhesive), and the metal part is only heated to around 107 degrees Fahrenheit (which is well below any temperature that could alter the material properties or damage the metal part). It is better for the temperature of the non-magnetic shield 20 to be closer to the temperature of the susceptor 18 and for the temperature of the metal panel 10 to be lower. As shown by the results of FIG. 5, the copper shield blocks the magnetizing field from entering or reaching the metal substrate. Additionally, the magnetic field heats the susceptor and resin quickly but the metal (e.g., steel) heats only slightly.

Figure 6:
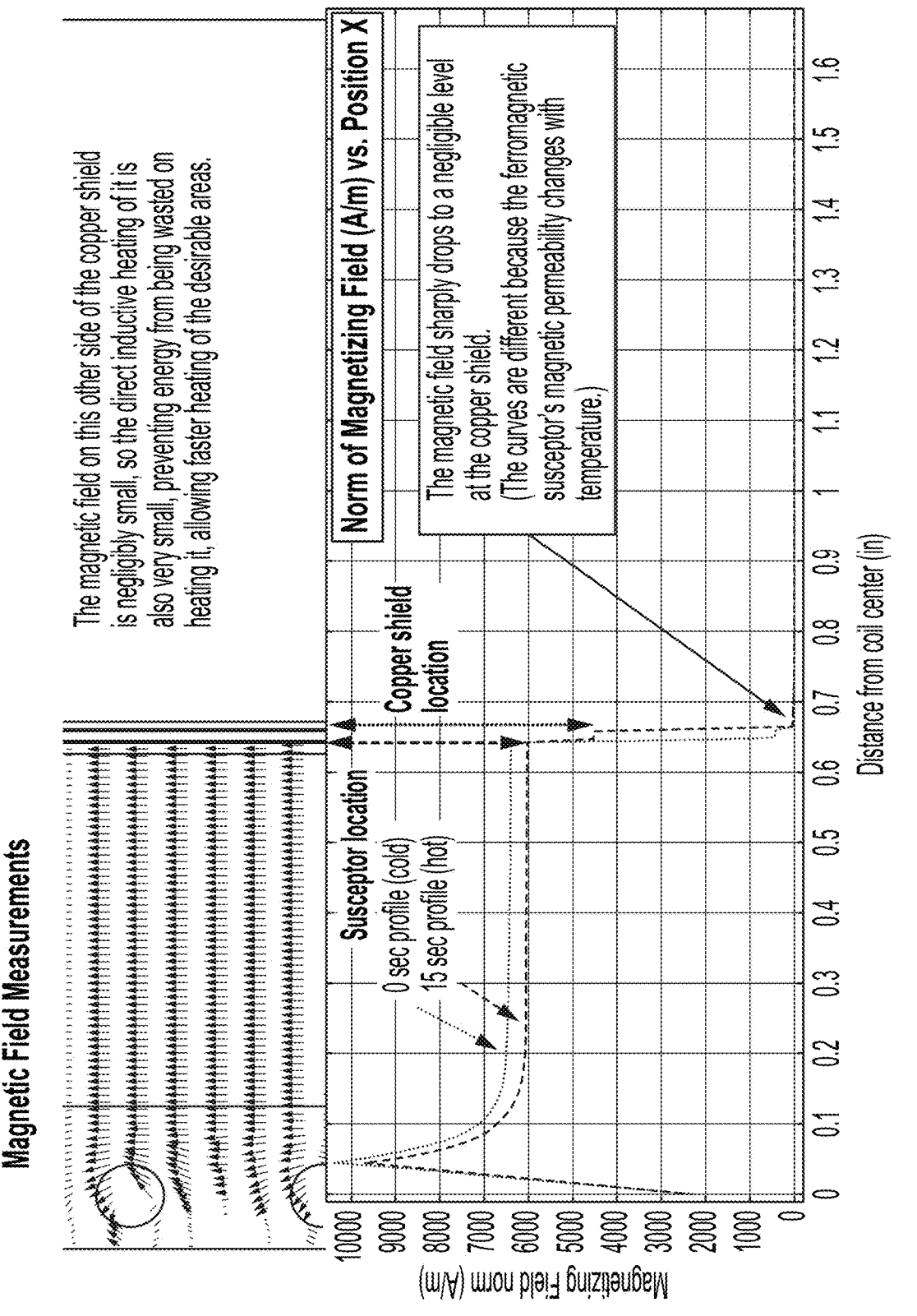
FIG. 6 shows magnetic field measurements when applying an electromagnetic field to the exemplary laminate construction of FIG. 4.
Figure 7:
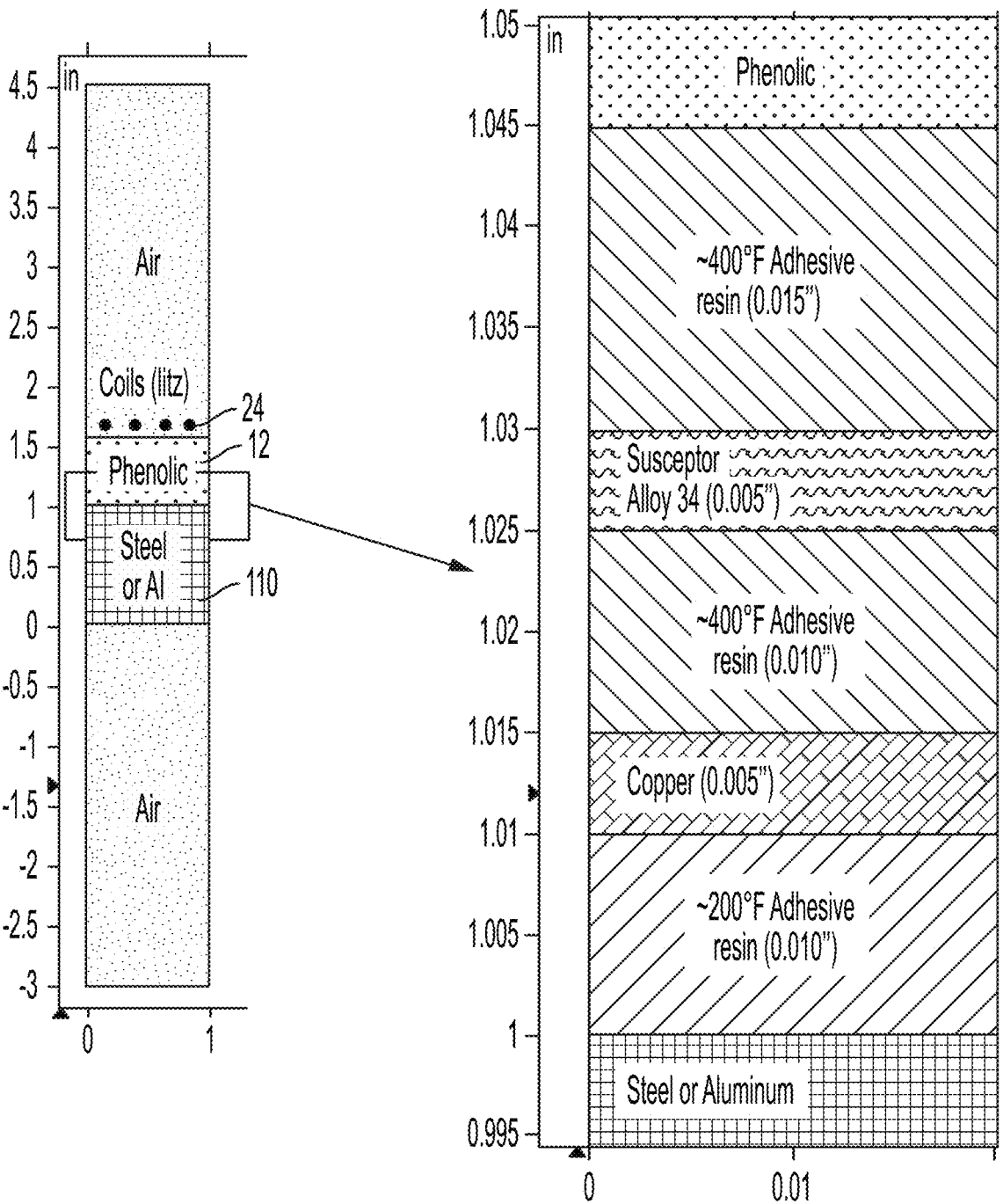
FIG. 7 is a schematic of another exemplary laminate construction of the phenolic laminate panel.

As shown in FIG. 6, the copper shield limits the electromagnetic field from reaching the metal part. The measured magnetic field sharply drops to a negligible level at the copper shield. In other words, the magnetic field on the other side of the copper shield (opposite the ferromagnetic susceptor) is negligibly small, so the direct inductive heating of the metal part is also very small, preventing energy from being wasted on heating the metal, allowing for faster heating of the desirable areas.

Other laminate constructions may be implemented, such as a construction having two non-magnetic (e.g., copper) shields stacked on one another and adhesively bonded at the susceptor, or such as a construction having different thicknesses of the layers and/or different adhesives.

The ferromagnetic susceptor may be configured to heat the laminate panel to a maximum temperature that is above the melting point temperature of the low melting point adhesive and below the melting point temperature of the high melting point adhesive. For example, the ferromagnetic susceptor may include a ferromagnetic material that has a Curie temperature (i.e., a temperature at which, during induction heating, the ferromagnetic material loses its magnetic properties and thus stops heating responsive to the applied magnetic field, effectively a maximum temperature that can be reached by the susceptor when heated by induction heating) that is greater than the melting temperature of the low melting point adhesive and less than the melting temperature of the high melting point adhesive. Thus, when the laminate panel is applied or removed from the steel surface of the vehicle, a constant magnetic field may be applied to the laminate panel to melt the low melting point adhesive without overheating the laminate panel and melting the high melting point adhesive or damaging the steel surface. The heating of the laminate panel may thus be controlled by the ferromagnetic properties of the smart susceptor and the smart susceptor may be an alloy having any suitable Curie temperature. For example, the smart susceptor may comprise an alloy having a Curie temperature of about 300 degrees Fahrenheit and the high melting point adhesive may have a melting temperature of about 350 degrees Fahrenheit. In such a construction, there would be no chance of delamination of the laminate construction (i.e., melting of the high melting point adhesive) during induction heating, since the smart susceptor cannot be inductively heated to that temperature. When the Curie temperature of the ferromagnetic susceptor is between the melting points of the high and low melting point adhesives, delamination of the laminate panel construction is unlikely because the high melting point adhesive will not melt when the laminate panel is heated, maintaining the construction of the laminate panel. Optionally, the temperature achieved by heating the ferromagnetic susceptor may be controlled by adjusting the current and frequency of the magnetic field applied by the induction coils.

The constructions provided best test results at the highest frequency setting, and highest power setting (e.g., 48 A and 500 kHz or 1,000 kHz). The variations in susceptor thicknesses for the different laminate panel did not significantly affect performance, so the thinnest susceptor is preferred for its weight and cost savings. The metal (e.g., steel) substrate has a much higher magnetic permeability than the susceptor, (for the temperatures of interest here), so the fact that the susceptor heats much faster means that the magnetic fields are very effectively blocked by the 0.005 inches thick layer or sheet of copper.

Optionally, the ferromagnetic susceptor and/or the non-magnetic shield(s) may have a plurality of holes in them so there is a continuous (bridge) of resin/adhesive that is not separated during the attachment or removal of the phenolic panel. Thus, when the higher temperature adhesives are heated to form the phenolic laminate panel, the melted adhesive flows into the holes of the susceptor and/or non-magnetic shield to further enhance the structural integrity of the phenolic laminate panel.

Optionally, a phenolic laminate construction could also be applied using resistance heating (or microwave heating or radiant heating via convection). For example, the panel may have a heatable substrate (heatable via applying electrical current thereto) that, when heated, melts the low temperature adhesive layer to bond the laminate construction to the metal (e.g., steel) panel. In such an application, the laminate construction may not include a non-magnetic shield. The phenolic laminate construction may be heated utilizing aspects of the constructions and systems and methods described in U.S. patent application Ser. No. 17/656,887, filed Mar. 29, 2022, and/or U.S. patent application Ser. No. 17/651,430, filed Feb. 17, 2022, which are hereby incorporated herein by reference in their entireties.

Therefore, the present invention provides a phenolic laminate panel that can be readily heated and applied to a steel part (or a part or panel or component formed of another metal, such as aluminum, or a composite material) and similarly heated and removed from the steel part, without damaging the steel part. The laminate construction includes the phenolic panel with a ferromagnetic susceptor bonded at a side of the phenolic panel and with a non-magnetic shield (e.g., a copper shield) bonded at the susceptor (at the side of the susceptor opposite from the phenolic panel). The susceptor and non-magnetic shield are bonded at the phenolic panel using a higher melting point adhesive. A layer of lower melting point adhesive is applied at the non-magnetic shield and is used to bond the laminate panel to the steel part.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A panel attachment system, the panel attachment system comprising:

a laminate panel, the laminate panel comprising (i) a non-magnetic panel having an outer side and an inner side, (ii) a ferromagnetic susceptor having an outer side bonded at the inner side of the non-magnetic panel via a first layer of a higher melting point adhesive and (iii) a non-magnetic shield having an outer side bonded at an inner side of the ferromagnetic susceptor, opposite from the outer side of the ferromagnetic susceptor, via a second layer of higher melting point adhesive;

a layer of a lower melting point adhesive is applied at an inner side of the non-magnetic shield opposite from the outer side of the non-magnetic shield;

wherein the lower melting point adhesive has a melting point below a melting point of the higher melting point adhesive, and wherein the lower melting point adhesive melts and bonds-when heated to a temperature above the melting point of the lower melting point adhesive;

wherein, with the laminate panel disposed at a metal part, an electromagnetic field is generated at the laminate panel to heat the laminate panel to a first temperature that is greater than the melting point of the lower melting point adhesive and less than the melting point of the higher melting point adhesive; and with the laminate panel heated to the first temperature, the lower melting point adhesive melts, and wherein the lower melting point adhesive cures to bond the laminate panel to the metal part.

2. The panel attachment system of claim 1, wherein, when the electromagnetic field is generated at the laminate panel, the ferromagnetic susceptor generates heat responsive to the electromagnetic field to heat the laminate panel to the first temperature.

3. The panel attachment system of claim 1, wherein the higher melting point adhesive has a melting point temperature that is higher than the melting point temperature of the lower melting point adhesive.

4. The panel attachment system of claim 1, wherein the metal part of comprises at least one selected from the group consisting of (i) steel, (ii) Aluminum and (iii) a composite material.

5. The panel attachment system of claim 1, wherein the non-magnetic shield comprises a copper shield.

6. The panel attachment system of claim 1, wherein the ferromagnetic susceptor has a plurality of holes formed therethrough, and wherein the higher melting point adhesive, when melted to form the laminate panel, is disposed within the plurality of holes of the ferromagnetic susceptor.

7. The panel attachment system of claim 1, wherein the non-magnetic shield has a plurality of holes formed therethrough, and wherein the higher melting point adhesive, when melted to form the laminate panel, is disposed within the plurality of holes of the non-magnetic shield.

8. The panel attachment system of claim 1, wherein, with the phenolic laminate panel disposed at a metal part and with the laminate panel heated to the first temperature to melt the lower melting point adhesive, pressure is applied at the laminate panel to press the laminate panel against the metal part.

9. The panel attachment system of claim 1, wherein, when the electromagnetic field is generated at the laminate panel, the non-magnetic shield limits exposure of the metal part to the electromagnetic field.

10. The panel attachment system of claim 1, wherein the metal part comprises a composite material, and wherein the non-magnetic panel comprises a composite material.

11. The panel attachment system of claim 1, wherein the metal part comprises a non-magnetic composite material.

12. A panel attachment system, the panel attachment system comprising:

a laminate panel, the laminate panel comprising (i) a non-magnetic panel having an outer side and an inner side, (ii) a heatable substrate having an outer side bonded at the inner side of the non-magnetic panel via a first layer of a higher melting point adhesive and (iii) a non-magnetic shield having an outer side bonded at an inner side of the heatable substrate, opposite from the outer side of the heatable substrate, via a second layer of higher melting point adhesive;

wherein the heatable substrate comprises a ferromagnetic material and an electrically conductive material, and wherein the heatable substrate is heated by energizing the electrically conductive material to create a magnetic field at the ferromagnetic material;

a layer of a lower melting point adhesive is applied at an inner side of the non-magnetic shield opposite from the outer side of the non-magnetic shield;

wherein the lower melting point adhesive has a melting point, and wherein the lower melting point adhesive melts when heated to a temperature above the melting point of the lower melting point adhesive;

wherein, with the laminate panel disposed at a metal part, the heatable substrate is heated to heat the laminate panel to a first temperature that is greater than the melting point of the lower melting point adhesive; and with the laminate panel heated to the first temperature, the lower melting point adhesive melts, and wherein the lower melting point adhesive cures to bond the laminate panel to the metal part.

13. The panel attachment system of claim 12, wherein the higher melting point adhesive has a melting point temperature that is higher than the melting point temperature of the lower melting point adhesive.

14. The panel attachment system of claim 13, wherein the first temperature is greater than the melting point of the lower melting point adhesive and less than the melting point of the higher melting point adhesive.

15. The panel attachment system of claim 12, wherein the metal part comprises at least one selected from the group consisting of (i) steel, (ii) Aluminum and (iii) a composite material.

16. The panel attachment system of claim 12, wherein the heatable substrate has a plurality of holes formed therethrough, and wherein the higher melting point adhesive, when melted to form the laminate panel, is disposed within the plurality of holes of the heatable substrate.

17. The panel attachment system of claim 12, wherein, with the laminate panel disposed at a metal part and with the laminate panel heated to the first temperature to melt the lower melting point adhesive, pressure is applied at the laminate panel to press the laminate panel against the metal part.

18. The panel attachment system of claim 12, wherein the ferromagnetic material has a Curie temperature that is greater than the melting point of the lower melting point adhesive and less than a melting point of the higher melting point adhesive.

19. The panel attachment system of claim 12, wherein the non-magnetic panel comprises a phenolic material.

20. The panel attachment system of claim 12, wherein the metal part comprises a composite material, and wherein the non-magnetic panel comprises a composite material.

21. The panel attachment system of claim 12, wherein the metal part comprises a non-magnetic composite material.

22. A panel detachment system, the panel detachment system comprising:

a first part, the first part comprising a (i) a non-magnetic panel having an outer side and an inner side, (ii) a heatable substrate having an outer side bonded at the inner side of the non-magnetic panel and (iii) a non-magnetic shield having an outer side bonded at an inner side of the heatable substrate opposite from the outer side of the heatable substrate;

wherein the heatable substrate comprises a ferromagnetic material, and wherein the ferromagnetic material generates heat at the first part responsive to an electromagnetic field generated at the first part;

wherein the first part is adhesively attached at a second part via a lower melting point adhesive, and wherein the lower melting point adhesive is between the second part and an inner side of the non-magnetic shield opposite from the outer side of the non-magnetic shield;

wherein the lower melting point adhesive has a melting point;

wherein, with the first part adhesively attached at the second part, the electromagnetic field is generated at the first part to heat the first part to a first temperature that is greater than the melting point of the lower melting point adhesive; and with the first part heated to the first temperature, the lower melting point adhesive melts and releases from the second part to allow the first part to be removed from the second part.

23. The panel detachment system of claim 22, wherein the heatable substrate is bonded at the inner side of the non-magnetic panel via a first layer of higher melting point adhesive, and wherein the non-magnetic shield is bonded at the inner side of the heatable substrate via a second layer of the higher melting point adhesive, and wherein the higher melting point adhesive comprises a melting point above the melting point of the lower melting point adhesive, and wherein the first temperature is less than the melting point of the higher melting point adhesive.

24. The panel detachment system of claim 22, wherein the ferromagnetic material has a Curie temperature that is greater than the melting point of the lower melting point adhesive.

25. The panel detachment system of claim 22, wherein the non-magnetic panel comprises at least one selected from the group consisting of (i) a thermoset material, (ii) a thermoplastic material, (iii) a phenolic material and (iv) a composite material.

26. The panel detachment system of claim 22, wherein the first part comprises a laminate panel.

27. The panel detachment system of claim 22, wherein the second part comprises a metal part.

* * * * *